Oct. 25, 1938.  C. S. BRAGG ET AL  2,134,502
BRAKE
Original Filed June 27, 1930   2 Sheets-Sheet 1

INVENTORS
Caleb S. Bragg and
BY Victor W. Kliesrath
Jerome R. Cox
ATTORNEY.

Oct. 25, 1938.   C. S. BRAGG ET AL   2,134,502
BRAKE
Original Filed June 27, 1930   2 Sheets-Sheet 2

INVENTORS
Caleb S. Bragg
Victor W. Kliesrath
BY Jerome R. Cox
ATTORNEY.

Patented Oct. 25, 1938

2,134,502

UNITED STATES PATENT OFFICE 2,134,502

BRAKE

Caleb S. Bragg, Palm Beach, Fla., and Victor W. Kliesrath, South Bend, Ind.

Original application June 27, 1930, Serial No. 464,176. Patent No. 1,945,515, February 6, 1934. Divided and this application December 15, 1933, Serial No. 702,460

21 Claims. (Cl. 188—152)

This application is a division of our copending application, Serial No. 464,176, which has issued as Patent No. 1,945,515. The subject matter of certain of the claims herein was disclosed but not claimed in our prior Patent 1,923,185 issued upon application Serial No. 265,091, filed March 27, 1928, which application was copending with the said parent application 464,176 but not with the present application.

Our invention consists in the novel features hereinafter described, reference being had to the accompanying drawings which show several embodiments of the invention selected by us for purposes of illustration, and the said invention is fully disclosed in the following description and claims.

Our invention relates to brake systems for automotive vehicles in which a power actuator operated by differentials of fluid pressures is employed for operating the brake mechanisms under the control of suitable valve mechanism, and it is especially applicable to vacuum brake systems for automotive vehicles in which the differentials of fluid pressures are obtained by using atmospheric pressure and suction or partial vacuum conveniently obtained by a connection with the suction passage of the internal combustion engine used in propelling the vehicle, between the usual throttle valve, when in closed or partially closed position, and the engine cylinders, as the lower fluid pressure.

In carrying our invention into effect, we employ a controlling valve mechanism of novel and extremely cheap and simple construction, which may be employed in a variety of ways and uses to control power actuators of the pressure-balanced type and also power actuators of the vacuum-balanced type. The valve mechanism comprises parts which, during the power stroke of the actuator, are subjected to differentials of fluid pressure corresponding with those in the actuator effective as a reactionary force exerted in a direction to resist the movement of an operator operated part, to continue the power stroke of the actuator, or hold the movable part or parts thereof in a position intermediate of the power stroke thereof. The valve mechanism may be actuated by a physically operable part wholly unconnected with the brake mechanism, or it may be actuated by a physically operable part having a connection with the brake mechanism and with the power actuator, and in either case a "follow-up" action of the valve mechanism may be secured to permit the brakes to be gradually applied and held as applied in any position within the range of the power actuator, and additional power may, if desired, be applied to the brake mechanisms by the physical force of the operator after the power of the actuator has been fully exerted.

Our invention also comprises certain novel features of construction and combination of parts hereinafter fully disclosed and particularly pointed out in the claims.

Referring to the accompanying drawings which illustrate several embodiments of our invention selected by us for purposes of illustration.

Figure 1:
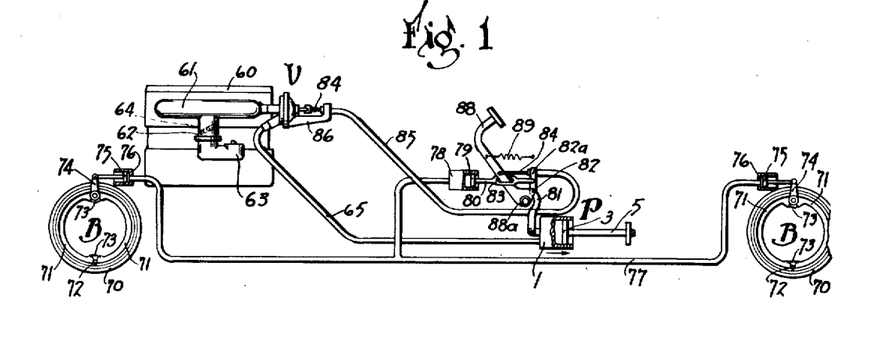
Fig. 1 is a diagrammatic view of a hydraulic brake system for automotive vehicles embodying our invention and including a pressure-balanced power actuator and controlling valve mechanism therefor.

Referring to the diagram Fig. 1, it will be understood that it represents a typical brake system, in this instance a hydraulic brake system, for an automotive vehicle embodying our invention, in which 60 represents the internal combustion engine for propelling the vehicle, having the suction passage comprising the intake manifold 61, and the vertical passage 62 leading from the carburetor 63, said vertical passage being provided with the usual throttle valve 64, indicated in dotted lines. B, B, represent brake mechanisms for the front and rear wheels, one of each of which is illustrated. The brake mechanisms may be of any desired type, but as shown they comprise the brake drum 70, provided with interior brake shoes 71, hinged together at 72, and having their upper ends engaging the usual expanding member (not shown) which is operated by the brake applying lever 74, the shoes being provided with the usual retracting springs 73. In this instance the levers 74 of the several brake mechanisms are connected with the pistons 75 of hydraulic brake applying cylinders 76 connected by suitable piping 77 with a main hydraulic or pressure cylinder 78 having a pressure piston 79 connected by the rod or link 80, in this instance with a power applying lever 81 pivotally mounted at 82 on the usual brake pedal lever 88 provided with the retracting spring 89. The lower end of the power applying lever 81 is connected with a movable member of a power actuator indicated as a whole at P. In this instance the lever 81 is shown pivotally connected to and supporting a cylinder 1 of a power actuator of the pressure-balanced type having a piston 3, the piston rod 5 of which is pivotally connected with a fixed portion of the chassis. The cylinder 1 is closed at one end and open to the atmosphere at the other, so that the rear face of the piston is exposed at all times to atmospheric pressure, and as hereinafter explained, the closed end of the cylinder 1 is connected by the valve mechanism, when in released position, with the atmosphere so that the forward face of the piston is also exposed to atmospheric pressure. The piston is, therefore, submerged in air or pressure-balanced when in released position. The link rod 80 is provided with a slot 83 surrounding the pedal lever and providing a slight amount of lost motion between it and said lever. The spring 89 normally holds the pedal lever in engagement with the rear end of said slot 83 when the parts are in released position and it will be obvious that when the pedal lever is depressed so as to take up the lost motion between it and the link rod 80, the physical power of the operator can be exerted on the pressure piston 79 and therethrough to the brake applying cylinders and pistons and the brake mechanisms connected with the latter.

Figure 2:
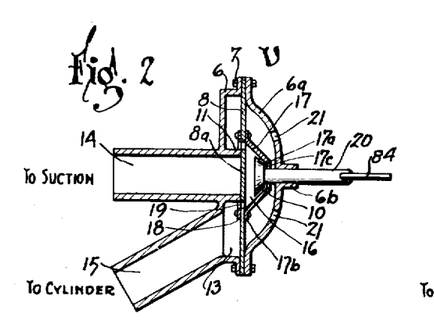
Fig. 2 is an enlarged sectional view of the valve mechanism illustrated in Fig. 1.

The controlling valve mechanism for the actuator is represented as a whole at V and is shown in detail in section in Fig. 2. The valve casing preferably comprises two members 6 and 6a, which are conveniently made circular in cross-section and have their marginal portions connected as by bolts or screws 7 so as to clamp between them a flexible diaphragm valve 8. The casing member 6 is provided with an annular seat member 11 adapted to be engaged by the central portion of the diaphragm and communicating with a tubular connection 14. An annular passage 13 surrounds the annular seat member 11 and is connected with a second tubular connection 15 which conveniently has its axis disposed at an angle to its connection 14 to facilitate the installation of the valve mechanism. The face of the diaphragm 8 opposite that which engages the annular seat 11 is provided with an inlet valve chamber 16 having a centrally located internal seat indicated at 17a. This chamber 16 can be conveniently formed by a stamping 17 of sheet metal provided with an annular flange portion 17b for engaging the diaphragm and having a central aperture 17c. This stamping may be conveniently secured to the diaphragm by rivets passing through the flange portion 17b and through the diaphragm and a ring 18 on the opposite side thereof, as indicated in Fig. 2, and in this instance the seat portion 17a is conveniently formed by the walls of the stamping adjacent to the central aperture 17c. The diaphragm 8 is provided with a plurality of apertures 19 exterior to the seat engaging portion 8a thereof and connecting the chamber 16 with the chamber 13 in the casing member 6. Within the chamber 16 is located a valve 10 having a valve stem 20 extending through the aperture 17c without fully closing the same and having a guiding engagement with a sleeve 6b on the casing member 6a. The casing member 6a is also provided with apertures 21 so that the outer face of the diaphragm 8 and of the walls of the stamping 17 connected therewith are at all times subjected to atmospheric pressure, whether the valve 10 is seated or not.

It is to be understood that this form of valve mechanism is capable of a very wide range of use, as will be hereinafter more particularly pointed out. The connections 14 and 15 may be connected respectively, the one with a source of suction, i. e., the manifold, and the other with a power actuator between the piston and the closed end of the cylinder thereof, and in the alternate positions of the valve mechanism, to-wit, with the diaphragm 8 seated and the valve 10 unseated on the one hand and with the valve 10 seated and the diaphragm unseated on the other hand, the cylinder can be alternately connected with suction and with atmosphere, while if the diaphragm 8 and valve 10 are both seated simultaneously the cylinder will be disconnected from both suction and atmosphere.

In the installation shown in Fig. 1, the connection 14 is connected with suction, being in this instance directly connected with the intake manifold 61 in any usual or preferred manner. The connection 15 is connected by a pipe 65 which may be in whole or in part a flexible hose with the closed end of the cylinder 1. In such case, when the valve is in the released position as indicated in Fig. 2 with the diaphragm 8 seated and the valve 10 unseated, the cylinder 1 will be disconnected from the manifold by the engagement of the portion 8a of the diaphragm with the annular seat member 11 while the cylinder will be in communication with the atmosphere through the central aperture 17c of the stamping 17 and ports 19.

In the installation shown in Fig. 1, the valve mechanism is connected for operation with the pedal lever 88 by means of a Bowden wire 84, the casing 85 of which has one end rigidly secured to a bracket 86 in fixed relation to the valve casing, while the other end is rigidly connected with an extension 82a of the power applying lever 81.

The parts being in released position as shown in Figs. 1 and 2 and assuming that the engine is running and the throttle valve is closed, a partial vacuum represented by approximately twenty inches of mercury on the vacuum gauge at sea level will exist in the intake manifold 61 and in the tubular connection 14 of the valve mechanism, there will, therefore, exist a maximum differential of fluid pressures on the central portion 8a of the diaphragm which will be exerted in a direction to hold the diaphragm firmly seated on the seat member 11. To effect an operation of the brake mechanism, the operator will depress the pedal lever 88, thereby exerting a pull on the Bowden wire 84 which will first seat the valve 10 shutting off communication between the actuator cylinder and atmosphere and will then unseat the diaphragm 8 from the seat member 11 and thus connect the actuator cylinder forward of the piston with the intake manifold. Air will be withdrawn from the closed end of the actuator cylinder, and as the piston is in this instance held from movement, the atmospheric pressure on the outer face of the closed end of the cylinder will cause the cylinder to move in the direction of the arrow, Fig. 1, carrying with it the lower end of the lever 81 and transmitting the power of the actuator, which may be multiplied by the lever 81 as shown, to the piston 79 of the hydraulic pressure cylinder, and thus to the brake mechanism connected therewith. The brakes will be applied with increasing power as long as the forward movement of the pedal lever continues, and if the movement of the pedal lever is stopped at any point before power of the actuator is fully applied, the continuing movement of the actuator cylinder will cause a relative movement between the power applying lever and the pedal lever and will effect a movement of the casing 85 of the Bowden wire with respect to the wire 84 so as to partially release the valve stem 20 sufficiently to permit the diaphragm to seat on the seat member 11, thus closing off communication between the cylinder and the suction in the manifold and arresting the stroke of the power actuator and holding the brakes as applied. This effects a mechanical "follow-up" and enables the brake mechanism to be applied proportionately to the extent of movement of the pedal lever. As soon as the pedal is depressed to produce a power stroke of the actuator, and during the entire power stroke thereof, it will be seen that the outer surface of the diaphragm and shell or stamping 17 will be exposed to atmosphere, while the inner surface of the diaphragm will be exposed to suction. There will, therefore, be a differential of fluid pressures exerted on the valve parts corresponding with that in the actuator and exerted in a direction to seat the diaphragm. This differential of fluid pressures will be transmitted through the valve stem 20 and the Bowden wire to the pedal lever in a direction to resist the forward movement of the pedal lever, and will be felt by the operator on the sole of his foot, so as to enable him to determine the extent to which the power of the actuator is applying the force to the brake mechanisms. The degree of reactionary force thus provided will depend upon the diameter of the diaphragm 8 which is exposed to differentials of fluid pressures during the power stroke of the actuator. In some instances where it is not desired to unduly increase the diameter of the diaphragm and therefore of the valve casing, and additional reactive force on the pedal is required or desired, a certain amount of the power of the actuator may be diverted for this purpose. This may be conveniently effected by pivoting the power applying lever 81 at a point on the pedal lever eccentrically to the pivotal axis of the pedal lever and in such relation thereto that, during the power stroke of the actuator to apply the brakes, a portion of the power of the actuator will be applied to the pedal lever through said pivotal connection between the levers 81 and 88, to-wit, at the point 82 to exert a mechanical reaction on the pedal lever. Thus in Fig. 1 the lever 81 is shown pivoted at 82 to the pedal lever at a point above the pivotal axis 88ª thereof, so that the pedal lever will be subjected to the reactionary force from the movable cylinder of the power actuator in addition to the reactionary force caused by the differential of fluid pressures on the valve part.

Figure 6:
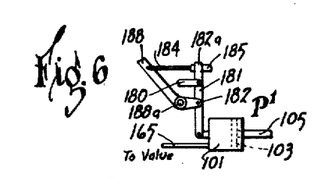
Fig. 6 is a detail view of parts of the apparatus shown in Fig. 1, illustrating a slight modification thereof.

No claims herein are intended to read on the specific structure shown in Sorenson Patent No. 1,953,057.

Where the differential of fluid pressures on the valve is sufficient to supply the desired amount of reactionary force and no material reaction from the power actuator is desired, the power applying lever may be connected with the pedal lever in substantial alignment with the pivotal axis of the pedal lever, so that any reaction from the power applying lever will be taken up directly by the pivotal connection of the pedal lever, as shown in Fig. 6 for example, in which the parts corresponding to those illustrated in Fig. 1 are given the same reference characters with the addition of 100 to avoid repetition.

When the brakes have been applied by the full power of the actuator, a further depression of the pedal lever, which will take up the lost motion between it and the forward end of the slot 83 (Fig. 1) will enable the operator to add physical force to the brakes in addition to the force exerted by the actuator, and in like manner will permit the brakes to be applied by physical force alone in case the engine is not running, or in case the power should fail for any reason. The adjustment of the valve by means of the Bowden wire must be such that the stamping 17 just clears the casing 6ª, when the depression of the pedal causes it to engage the end of the slot 83.

Figure 3:
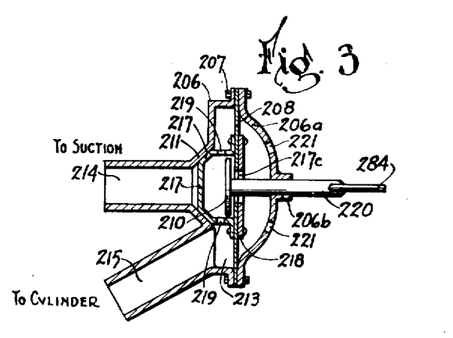
Fig. 3 is a similar view of a slightly modified form of the valve mechanism illustrated in Fig. 2.

In Fig. 3, in which the parts corresponding with those illustrated in Fig. 2 are given the same reference numerals with the addition of 200, we have illustrated a modified form of the valve in which the diaphragm 208 is provided with a central aperture 217ᶜ and carries on its rear face a shell or stamping 217 forming within it the air inlet valve chamber provided with an annular valve seat 217ª to engage an annular conical seat 211 formed in this instance in the casing member 206, the shell or stamping being provided with lateral apertures 219 communicating with the chamber 213 which in turn communicates with the connection 215 ordinarily connected with a closed end of the pressure balanced actuator cylinder, while the connection 214 leading to the valve seat 211 is connected with suction. Within the shell or stamping 217 is a disc valve 210 carried by the valve stem 220 and adapted to seat on the inner face of the diaphragm and close the aperture 217ᶜ. In attaching the shell or stamping 217 to the diaphragm, it is conveniently riveted therethrough and through a ring 218 which in this instance is on the front face of the diaphragm and extends to the edges of the aperture 217ᶜ, so as to form a support for the portions of the diaphragm surrounding this opening when the latter are engaged by the disc valve. The operation of this form of valve mechanism will be exactly the same as that previously described with reference to the form shown in Fig. 2.

Figures 8, 9:
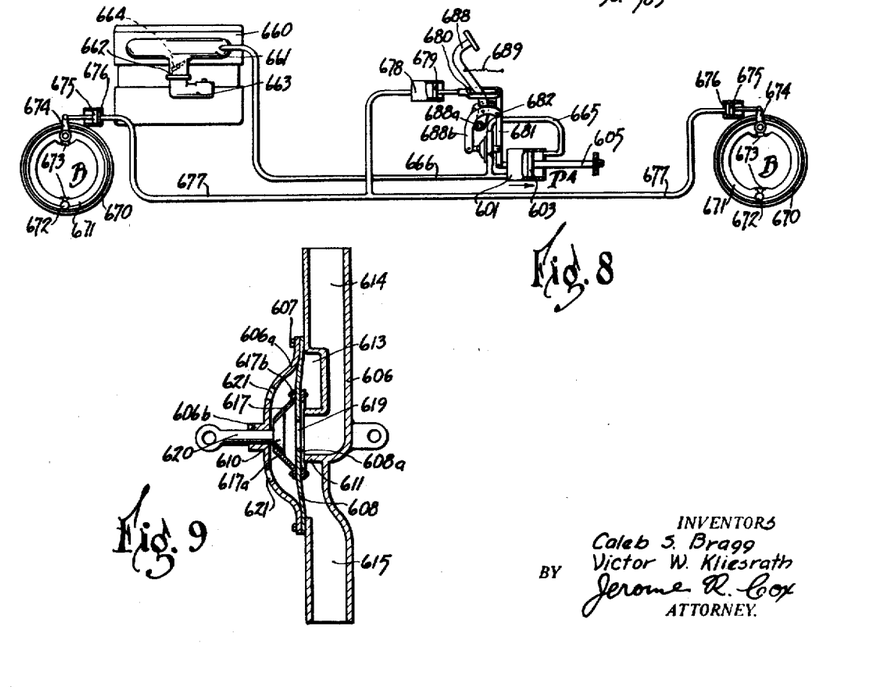
Fig. 8 is a diagram similar to Figs. 1 and 5, showing a further modified arrangement in which the valve mechanism is installed between an extension of the pedal lever and a power applying lever pivotally connected therewith.
Fig. 9 is an enlarged detail sectional view of the form of valve mechanism illustrated in Fig. 8, showing another slight modification thereof.

Either of these valve mechanism can also be used for controlling a power actuator of the vacuum balanced type, an example of which actuator is shown in Fig. 8. In this type of actuator the cylinder is closed at both ends, a portion of the cylinder forward of the piston is at all times connected with the intake manifold, and the portion of the cylinder in rear of the actuator is normally connected with the suction source through the valve mechanism, which admits air to the cylinder in rear of the piston to produce a power stroke and withdraw the admitted air to release the piston and permit the brakes connected therewith to be released.

We desire to have it understood that the valve mechanism can be operated independently of the pedal lever, if this is found desirable. For example, in Fig. 5, in which the parts shown in Fig. 1 are given the same reference numerals with the addition of 300, we have shown an installation similar to that illustrated in Fig. 1, except that the Bowden wire 384 extends to a button 384ª, on the dash or instrument board, indicated at I, the casing 385 for the Bowden wire having one end secured to the bracket 386 and the other end secured to the instrument board I. In this case the brakes can be applied by power by simply pulling out the button 384ª and Bowden wire 384 to the desired extent, and during the power stroke the gradual increasing differential of fluid pressures on the movable valve parts would be transmitted to the hand of the operator, so as to advise him as to the extent to which the brakes are being applied by the actuator. The pedal lever need not be used, except to add further physical force to the brakes or to operate them by physical force if desired or in case of failure of power. In this case there would be no follow-up operation of the valve mechanism, and the operator, if he desired to apply the brakes gradually or to hold them as applied at an intermediate point in the stroke of the actuator, would accomplish this result by slightly relaxing his pull on the button 384ª.

Figure 4:
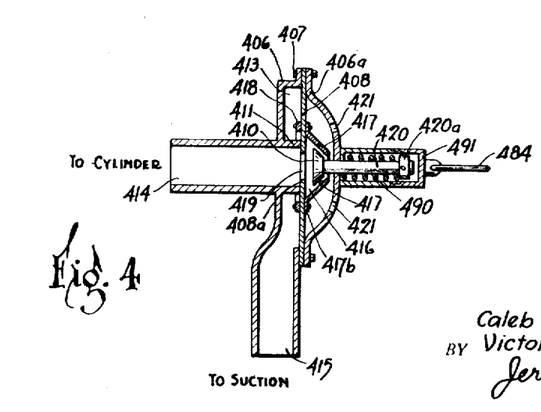
Fig. 4 is a similar sectional view of another modification of the valve mechanism.

In Fig. 4, in which the parts corresponding with those in Fig. 2 are given the same reference numerals with the addition of 400, we have illustrated a slightly modified form of valve and a simple follow-up action by interposing a spring 490 between the valve stem 420 and the Bowden wire, or other operative connection, to a physically operable part. In this form of the valve mechanism the diaphragm 408 is provided with a central aperture 419 within the annular seat engaging portion 408ª communicating with the connection 414 which in this instance leads to the closed end of a pressure balanced power actuator, while the connection 415 leads to suction. The valve is otherwise constructed in substantially the same manner as shown in Fig. 2. In this instance the Bowden wire 484 is connected to a separate casing 491 containing the spring 490 which is interposed between the inner end of the casing 491 and the collar 420ª on the valve stem. In the position of the parts illustrated in Fig. 4, the atmosphere will be connected with the cylinder in the released position of the valve mechanism, and a power stroke of the actuator can be inaugurated by pulling the casing 491 away from the valve mechanism sufficiently to compress the spring 490 to a greater or less extent and at the same time seat the disc valve 410 and unseat the diaphragm valve 408 so as to connect the actuator cylinder with suction. In this form of the invention, as the differential of fluid pressures builds up on the movable valve parts, the reactionary effect will be exerted through the collar 420ª on the spring 490 and as soon as it becomes great enough to overcome the tension of the spring as adjusted and increased by the pulling out of the casing 491, the diaphragm will seat itself on the seat member 411 shutting off the connection between the actuator cylinder and suction and holding the brakes as applied. If the spring casing 491 is further drawn out to further compress the spring 490, the diaphragm will again unseat and the brakes will be applied with increased force by the actuator. The spring 490 therefore provides a "follow-up" operation in connection with the gradually increasing differential of fluid pressures on the movable valve parts, and this reactionary force is enabled to perform the two functions of apprising the operator of the extent to which the power actuator is applying force to the brakes, and also to automatically arrest the stroke of the actuator at any intermediate point and thus permit the brakes to be gradually applied.

Figure 5:
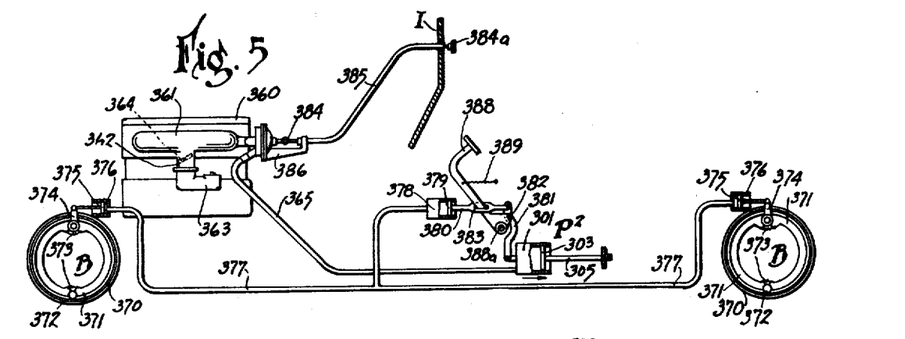
Fig. 5 is a diagram similar to Fig. 1 showing the controlling valve mechanism for the actuator adapted to be controlled from the dash or instrument board.

It will be understood that the operation of the valve mechanism will be effected by causing a relative movement between the movable valve parts and the valve casing and it is immaterial how this relative movement is effected. In Figs. 1 and 5 for example, we have shown the valve casing stationarily supported by and directly connected with the intake manifold, but we wish it to be understood that the valve casing may be mounted upon any other stationary part, or it may be mounted upon a movable part and operated from a relatively movable part connected with the movable valve parts.

Figure 7:
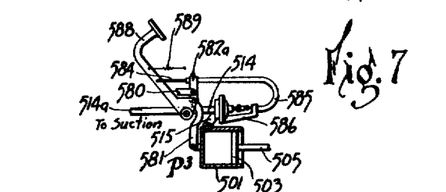
Fig. 7 is a similar view showing a further modification in which the valve mechanism is mounted on the cylinder of the power actuator.

For example in Fig. 7, in which the parts corresponding with those shown in Fig. 1 are given the same numerals with the addition of 500, we have shown the valve mechanism of the form illustrated in Fig. 2 supported by and connected with the closed end of the cylinder 501 of the power actuator, the connection 514 being connected by a suction pipe 514ª with the intake manifold, and at least a portion of said pipe will of necessity be made flexible to accommodate the movements of the cylinder. The movable valve parts are in this instance connected with the pedal lever by the Bowden wire 584 and Bowden housing 585 connected with the bracket 582ª, of lever 581, and with bracket 586 fastened to the valve casing, and the operation will be the same as that previously described with reference to Fig. 1.

In Figs. 8 and 9, in which the parts corresponding with those shown in Figs. 1 and 2 are given the same reference numerals with the addition of 600, we have shown in installation in which the valve casing is connected with and supported by the power transmitting lever 681, while the movable valve stem is connected to an extension 688ᵇ, of the pedal lever 688, the valve mechanism being operated by a pushing action instead of a pulling action and being slightly modified, as indicated in Fig. 9, to meet this situation. In this figure we have also the power actuator P4 of the vacuum balanced type in which the cylinder is closed at both ends, the forward end being connected at all times by the suction pipe 666 with the intake manifold 661, while the rear end is connected by the pipe 665 with the connection 614 of the valve casing member 606, while the connection 615 is connected with the suction pipe 666. Otherwise the valve mechanism is substantially identical with that shown in and previously described with reference to Fig. 4.

In the released position of the valve mechanism illustrated in Fig. 9, the disc valve 610 and the diaphraghm 608 is unseated by retracting spring 689 so that both ends of the cylinder are connected with vacuum and the actuator is vacuum balanced. The depression of pedal lever 688 will first seat the diaphragm on the seat member 611 to close off communication between the rear end of the actuator cylinder and suction, after which the valve 610 will be open to connect the rear end of the cylinder with atmosphere through the aperture 619. In other respects the apparatus shown in Figs. 8 and 9 operates as described with reference to Figs. 1 and 2, and reaction may be provided if desired as previously described, by pivoting the power applying lever 681 at 682 to a part connected with the pedal lever at a distance above the pivotal support 688ª of the pedal lever.

Obviously further variations in the construction of the valve mechanism and the installation thereof may be made without departing from our invention.

What we claim and desire to secure by Letters Patent is:

1. In a brake system for automotive vehicles, the combination with brake mechanism, a power actuator operated by differential pressures having relatively movable members, a pivoted pedal lever, a power applying lever pivotally connected therewith and operatively connected with brake mechanism, of means comprising a controlling valve mechanism for exerting a reactionary force on the pedal proportionate to the differential pressure, said valve mechanism having a valve casing provided with an annular seat, and a chamber surrounding said seat, said seat and said chamber being connected respectively with said actuator and with a source of suction, a diaphragm provided with seat engaging means and with an air inlet valve chamber secured to and supported by the diaphragm, means for connecting said valve chamber at all times with the portion of the valve casing in communication with the actuator, an air inlet valve in said valve chamber, and connections between said valve and the pedal lever, for operating said valve by the relative movement between it and the power applying lever.

2. In a brake system for automotive vehicles, the combination with brake mechanism, a power actuator having relatively movable members, a pivoted pedal lever, a power applying lever pivotally connected therewith and operatively connected with brake mechanism, of controlling valve mechanism comprising a valve casing provided with an annular seat, and a chamber surrounding said seat, said seat and said chamber being connected respectively with said actuator and with a source of suction, a diaphragm provided with seat engaging means and with an air inlet valve chamber secured to and supported by the diaphragm, means for connecting said valve chamber at all times with the portion of the valve casing in communication with the actuator, an air inlet valve in said valve chamber, and connections between said valve and the pedal lever, for operating said valve by the relative movement between it and the power applying lever, said power actuator being vacuum-balanced, and the differential of fluid pressures on opposite faces of the diaphragm and valve chamber, when the diaphragm is unseated reacting upon the pedal lever.

3. In a brake system for automotive vehicles, the combination with brake mechanism, a power actuator having relatively movable members, a pivoted pedal lever, a power applying lever pivotally connected therewith and operatively connected with brake mechanism, of controlling valve mechanism comprising a valve casing provided with an annular seat, and a chamber surrounding said seat, said seat and said chamber being connected respectively with said actuator and with a source of suction, a diaphragm provided with seat engaging means and with an air inlet valve chamber secured to and supported by the diaphragm, means for connecting said valve chamber at all times with the portion of the valve casing in communication with the actuator, an air inlet valve in said valve chamber, and connections between said valve and the pedal lever, for operating said valve by the relative movement between it and the power applying lever, said power actuator being vacuum-balanced, and the differential of fluid pressures on opposite faces of the diaphragm and valve chamber, when the diaphragm is unseated reacting upon the pedal lever, and the pivotal connection between the power transmitting lever and the pedal lever being so located with respect to the pivoted pedal lever as to exert reactionary force on the latter during the power stroke of the actuator.

4. In a brake system for automotive vehicles, the combination with brake mechanism, a power actuator operated by differential pressures having relatively movable members, a pivoted pedal lever, a power applying lever pivotally connected therewith and operatively connected with brake mechanism, of means comprising a controlling valve mechanism for exerting a reactionary force on the pedal proportionate to the differential pressure, said valve mechanism having a valve casing provided with an annular seat, and a chamber surrounding said seat, said seat and said chamber being connected respectively with said actuator and with a source of suction, a diaphragm provided with seat engaging means and with an air inlet valve chamber secured to and supported by the diaphragm, means for connecting said valve chamber at all times with the portion of the valve casing in communication with the actuator, an air inlet valve in said valve chamber, a Bowden wire extending from said air inlet valve to the pedal lever having one end of its casing secured rigidly with respect to the valve casing and the other secured to said power applying lever.

5. In a brake system for automotive vehicles, the combination with brake mechanism, a power actuator operated by differential pressure having relatively movable members, a pivoted pedal lever, a power applying lever pivotally connected therewith and operatively connected with brake mechanism, of means comprising a controlling valve mechanism for exerting a reactionary force on the pedal proportionate to the differential pressure, said valve mechanism having a valve casing provided with an annular seat, and a chamber surrounding said seat, said seat and said chamber being connected respectively with said actuator and with a source of suction, a diaphragm provided with seat engaging means and with an air inlet valve chamber secured to and supported by the diaphragm, means for connecting said valve chamber at all times with the portion of the valve casing in communication with the actuator, an air inlet valve in said valve chamber, and connections between said valve and the pedal lever, for operating said valve by the relative movement between it and the power applying lever, and means for limiting the relative movement between the pedal lever and the power applying lever.

6. In a brake system for automotive vehicles, the combination with brake mechanism, a power actuator having relatively movable members, a pivoted pedal lever, a power applying lever pivotally connected therewith and operatively connected with brake mechanism, of controlling valve mechanism comprising a valve casing provided with an annular seat, and a chamber surrounding said seat, said seat and said chamber being connected respectively with said actuator and with a source of suction, a diaphragm provided with seat engaging means and with an air inlet valve chamber secured to and supported by the diaphragm, means for connecting said valve chamber at all times with the portion of the valve casing in communication with the actuator, an air inlet valve in said valve chamber, and connections between said valve and the pedal lever, for operating said valve by the relative movement between it and the power applying lever, said power actuator being vacuum-balanced, and the differential of fluid pressures on opposite faces of the diaphragm and valve chamber, when the diaphragm is unseated, reacting upon the pedal lever, and means for limiting the relative movement between the pedal lever and the power applying lever.

7. In a brake system for automotive vehicles, the combination with brake mechanism, a power actuator operated by differential pressure having relatively movable members, a pivoted pedal lever, a power applying lever pivotally connected therewith and operatively connected with brake mechanism, of means comprising a controlling valve mechanism for exerting a reactionary force on the pedal proportionate to the differential pressure, said valve mechanism having a valve casing provided with an annular seat, and a chamber surrounding said seat, said seat and said chamber being connected respectively with said actuator and with a source of suction, a diaphragm provided with seat engaging means and with an air inlet valve chamber secured to and supported by the diaphragm, means for connecting said valve chamber at all times with the portion of the valve casing in communication with the actuator, an air inlet valve in said valve chamber, a Bowden wire extending from said air inlet valve to the pedal lever having one end of its casing secured rigidly with respect to the valve casing and the other secured to said power applying lever, and means for limiting the relative movement between the pedal lever and the power applying lever.

8. In a brake system for automotive vehicles provided with a throttle controlled suction passage, the combination with brake mechanism and a vacuum operated power actuator operated by differential pressure connected therewith, of means comprising a controlling valve mechanism for exerting a reactionary force on the pedal proportionate to the differential pressure, said valve mechanism having a casing having a tubular connection connected with the said suction passage and supporting said valve mechanism therefrom, and having a second tubular connection connected with the actuator, one of said connections communicating with a valve seat in said valve casing, a diaphragm having marginal portions in sealing engagement with the casing and provided with an inlet valve chamber having an air inlet aperture, said diaphragm and valve chamber being provided with valve means to engage said seat, and means for connecting said valve chamber at all times with one of said tubular connections, an air inlet valve in said valve chamber, and a physically operable part connected with said valve.

9. In a brake system for automotive vehicles provided with a throttle controlled suction passage, the combination with brake mechanism and a vacuum operated power actuator operated by differential pressure connected therewith, of means comprising a controlling valve mechanism for exerting a reactionary force on the pedal proportionate to the differential pressure, said valve mechanism having a casing having a tubular connection connected with the said suction passage and supporting said valve mechanism therefrom, and having a second tubular connection connected with the actuator, one of said connections communicating with a valve seat in said valve casing, a diaphragm having marginal portions in sealing engagement with the casing and provided with an inlet valve chamber having an air inlet aperture, said diaphragm and valve chamber being provided with valve means to engage said seat, and means for connecting said valve chamber at all times with one of said tubular connections, an air inlet valve in said valve chamber, a physically operable part, a Bowden wire connecting it with said valve, and having its casing rigidly secured adjacent to the valve casing and adjacent to said physically operable part.

10. In a brake system for automotive vehicles provided with a throttle controlled suction passage, the combination with brake mechanism and a vacuum operated power actuator operated by differential pressure connected therewith, of means comprising a controlling valve mechanism for exerting a reactionary force on the pedal proportionate to the differential pressure, said valve mechanism having a casing having a tubular connection connected with the said suction passage and supporting said valve mechanism therefrom, and having a second tubular connection connected with the actuator, one of said connections communicating with a valve seat in said valve casing, a diaphragm having marginal portions in sealing engagement with the casing and provided with an inlet valve chamber having an air inlet aperture, said diaphragm and valve chamber being provided with valve means to engage said seat, and means for connecting said valve chamber at all times with one of said tubular connections, an air inlet valve in said valve chamber, a pivoted pedal lever, a power transmitting lever pivoted thereto and forming part of the connections between the actuator and brake mechanism, a Bowden wire connecting said air inlet valve with the pedal lever, and having its casing secured to a part in fixed relation to the valve casing and to said power transmitting lever.

11. In a brake system for automotive vehicles provided with a throttle controlled suction passage, the combination with brake mechanism and a vacuum operated power actuator operated by differential pressure connected therewith, of means comprising a controlling valve mechanism for exerting a reactionary force on the pedal proportionate to the differential pressure, said valve mechanism having a casing having a tubular connection connected with the said suction passage and supporting said valve mechanism therefrom, and having a second tubular connection connected with the actuator, one of said connections communicating with a valve seat in said valve casing, a diaphragm having marginal portions in sealing engagement with the casing and provided with an inlet valve chamber having an air inlet aperture, said diaphragm and valve chamber being provided with valve means to engage said seat, and means for connecting said valve chamber at all times with one of said tubular connections, an air inlet valve in said valve chamber, a pivoted pedal lever, a power transmitting lever pivoted thereto and forming part of the connections between the actuator and brake mechanism, a Bowden wire connecting said air inlet valve with the pedal lever, and having its casing secured to a part in fixed relation to the valve casing and to said power transmitting lever, and means for limiting the relative movement between the pedal lever and power transmitting lever.

12. In a brake system for automotive vehicles, the combination with brake mechanism, a power actuator having relatively movable members, a pivoted pedal lever, a power applying lever pivotally mounted on said pedal lever and operatively connected with the brake mechanism, of controlling valve mechanism for said power actuator comprising relatively movable parts operatively connected to said aforementioned levers, the connections being such as to transmit from the valve parts to the pedal lever a reactionary load which is a function of the degree of power loading of the brakes by the power actuator to thus apprise the operator of the degree of power braking.

13. A brake system for automotive vehicles comprising a brake mechanism, a power actuator having relatively movable members, a pivoted pedal lever, a power applying lever pivotally mounted on said pedal lever and operatively connected with the brake mechanism, the connection between said levers and the connection between the power lever and actuator being such as to provide a reactionary load upon the pedal lever as the brake is applied, and controlling valve mechanism for said power actuator comprising relatively movable parts operatively connected to said aforementioned levers, the connections being such as to transmit from the valve parts to the pedal lever a reactionary load which is a function of the degree of power loading of the brakes by the power actuator to thus apprise the operator of the degree of power braking.

14. A brake system for a motor vehicle comprising a brake, a brake applying mechanism therefor, a pedal, a fluid pressure power device for actuating said brake applying mechanism, a valve for controlling said power device comprising a valve casing secured to a stationary part of said vehicle and a movable diaphragm having opposite faces subjected to differential pressures corresponding to the pressures acting on said power device, a floating lever, a connection between an intermediate portion of said lever and said brake applying mechanism, a compression connection between one end of said lever and a part of said valve, and a pivotal connection between said pedal and said floating lever at a point on the opposite side of said applying mechanism connection from said compression connection.

15. A brake system for a motor vehicle comprising a brake, a brake applying mechanism therefor, a pedal, a fluid pressure power device for actuating said brake applying mechanism, a valve for controlling said power device comprising a valve casing secured to a stationary part of said vehicle and a movable part having opposite faces subjected to differential pressures corresponding to the pressures acting on said power device, a floating lever, a connection between an intermediate portion of said lever and said brake applying mechanism, a compression connection between one end of said lever and a part of said valve, and a pivotal connection between said pedal and said floating lever at a point on the opposite side of said applying mechanism connection from said compression connection.

16. In a brake mechanism for automotive vehicles, the combination with brake mechanism, a power actuator operated by differential pressure having relatively movable members, a pivoted pedal lever, and a power applying lever pivotally connected therewith and operatively connected with brake mechanism, of means comprising a controlling valve mechanism for exerting a reactionary force on the pedal proportionate to the differential pressure, and connections between said valve and the pedal lever and between the valve and the power applying lever for operating said valve by the relative movement between the pedal lever and the power applying lever.

17. In a brake mechanism for automotive vehicles, the combination with brake mechanism, a power actuator operated by differential pressure having relatively movable members, a pivoted pedal lever, and a power applying lever pivotally connected therewith and operatively connected with brake mechanism, of means comprising a controlling valve mechanism for exerting a reactionary force on the pedal proportionate to the differential pressure, an air inlet valve in said valve mechanism, a Bowden wire extending from said air inlet valve to the pivoted lever having one end of its casing secured rigidly with respect to the valve casing and the other secured to said power applying lever.

18. In a brake mechanism for automotive vehicles, the combination with brake mechanism, a power actuator operated by differential pressure having relatively movable members, a pivoted pedal lever, and a power applying lever pivotally connected therewith and operatively connected with brake mechanism, of means comprising a controlling valve mechanism for exerting a reactionary force on the pedal proportionate to the differential pressure, connections between said valve and the pedal lever for operating said valve by the relative movement between it and the power applying lever, and means for limiting the relative movement between the pedal lever and the power applying lever.

19. In a braking system for automotive vehicles, the combination with brake mechanism, a power actuator operated by differential pressure, having relatively movable members, a pivoted pedal lever, and a power applying lever pivotally connected thereto and operatively connected with brake mechanism, of means comprising a controlling valve mechanism for exerting a reactionary force on the pedal proportionate to the differential pressure, an air inlet valve in said valve chamber, a Bowden wire extending from said air inlet valve to the pedal lever, having one end of its casing secured rigidly with respect to the valve casing and the other secured to said power applying lever, and means for limiting the relative movement between the pedal lever and the power applying lever.

20. In a brake system for automotive vehicles provided with a throttle controlled suction passage, the combination with brake mechanism and a vacuum operated power actuator, operated by differential pressure, connected therewith, of means comprising a controlling valve mechanism for exerting a reactionary force on the pedal proportionate to the differential pressure, an air inlet valve in said valve chamber, a pivoted pedal lever, a power transmitting lever pivoted thereto and forming part of the connections between the actuator and the brake mechanism, and a Bowden wire connecting said air inlet valve with the pedal lever and having its casing secured to a part in fixed relation to the valve connected and to said power transmitting lever.

21. In a brake system for automotive vehicles provided with a throttle controlled suction passage, the combination with brake mechanism and a vacuum operated power actuator, operated by differential pressure, connected therewith, of means comprising a controlling valve mechanism for exerting a reactionary force on the pedal proportionate to the differential pressure, an air inlet valve in said valve chamber, a pivoted pedal lever, a power transmitting lever pivoted thereto and forming part of the connections between the actuator and the brake mechanism, a Bowden wire connecting said air inlet valve with the pedal lever, and having its casing secured to a part in fixed relation to the valve casing and to said power transmitting lever, and means for limiting the relative movement between the pedal lever and the power transmitting lever.

CALEB S. BRAGG.
VICTOR W. KLIESRATH.

CERTIFICATE OF CORRECTION.

Patent No. 2,134,502.            October 25, 1938.

CALEB S. BRAGG.

It is hereby certified that error appears in the printed specification of the above numbered patent requiring correction as follows: Page 3, second column, line 3, after "part." insert the following -

> It is clear that this reactionary force is dependent upon the hydraulic pressures in the cylinder 78 inasmuch as the lever 81 actuated by the cylinder 1 must meet the resistance offered to movement of the piston 79 in order to provide a reaction at 82. This reaction at 82 which is transmitted to the pedal 88 is proportionate to the resistance encountered by the piston 79 and provides a hydraulic feel on the pedal proportionate to the power supply.;

line 68, for "mechanism" read mechanisms; and that the said Letters Patent should be read with this correction therein that the same may conform to the record of the case in the Patent Office.

Signed and sealed this 19th day of December, A. D. 1939.

(Seal)

Henry Van Arsdale,
Acting Commissioner of Patents.

and a Bowden wire connecting said air inlet valve with the pedal lever and having its casing secured to a part in fixed relation to the valve connected and to said power transmitting lever.

21. In a brake system for automotive vehicles provided with a throttle controlled suction passage, the combination with brake mechanism and a vacuum operated power actuator, operated by differential pressure, connected therewith, of means comprising a controlling valve mechanism for exerting a reactionary force on the pedal proportionate to the differential pressure, an air inlet valve in said valve chamber, a pivoted pedal lever, a power transmitting lever pivoted thereto and forming part of the connections between the actuator and the brake mechanism, a Bowden wire connecting said air inlet valve with the pedal lever, and having its casing secured to a part in fixed relation to the valve casing and to said power transmitting lever, and means for limiting the relative movement between the pedal lever and the power transmitting lever.

CALEB S. BRAGG.
VICTOR W. KLIESRATH.

CERTIFICATE OF CORRECTION.

Patent No. 2,134,502.            October 25, 1938.

CALEB S. BRAGG.

It is hereby certified that error appears in the printed specification of the above numbered patent requiring correction as follows: Page 3, second column, line 3, after "part." insert the following -

It is clear that this reactionary force is dependent upon the hydraulic pressures in the cylinder 78 inasmuch as the lever 81 actuated by the cylinder 1 must meet the resistance offered to movement of the piston 79 in order to provide a reaction at 82. This reaction at 82 which is transmitted to the pedal 88 is proportionate to the resistance encountered by the piston 79 and provides a hydraulic feel on the pedal proportionate to the power supply.;

line 68, for "mechanism" read mechanisms; and that the said Letters Patent should be read with this correction therein that the same may conform to the record of the case in the Patent Office.

Signed and sealed this 19th day of December, A. D. 1939.

(Seal)                          Henry Van Arsdale,
                                Acting Commissioner of Patents.